(12) United States Patent
Lee et al.

(10) Patent No.: US 7,650,825 B1
(45) Date of Patent: Jan. 26, 2010

(54) CASE TRIMMER AND CHAMFER TOOL

(76) Inventors: Richard J. Lee, 3146 Kettle Moraine Rd., Hartford, WI (US) 53207; John D. Lee, 3086 Kettle Moraine Rd., Hartford, WI (US) 53207

( * ) Notice: Subject to any disclaimer, the term of this patent is extended or adjusted under 35 U.S.C. 154(b) by 0 days.

(21) Appl. No.: 12/253,662

(22) Filed: Oct. 17, 2008

(51) Int. Cl.
*B21K 21/04* (2006.01)

(52) U.S. Cl. .............................. 86/19.7; 86/24; 86/28; 86/33; 86/37; 86/40

(58) Field of Classification Search ..................... 86/10, 86/19.7, 24, 28, 33, 37, 39, 40, 41; 81/3.05; 29/33 T; 30/94, 102; 407/43, 70, 97; 408/24, 408/42; 409/192, 203; 82/113
See application file for complete search history.

(56) References Cited

U.S. PATENT DOCUMENTS

| | | | | |
|---|---|---|---|---|
| 3,174,390 A | * | 3/1965 | Jacobsen | ........................ 86/24 |
| 3,765,785 A | * | 10/1973 | Humphreys et al. | ......... 408/1 R |
| 3,814,534 A | * | 6/1974 | Humphreys et al. | ........... 408/26 |
| 3,818,563 A | | 6/1974 | Beaulieu | |
| 4,325,282 A | * | 4/1982 | Schaenzer | ....................... 86/24 |
| 4,385,546 A | * | 5/1983 | Lee | ................................ 86/36 |
| 4,686,751 A | * | 8/1987 | Gracey | ........................ 86/19.7 |
| 4,813,827 A | | 3/1989 | Dugger | |
| 4,860,453 A | * | 8/1989 | Carroll | ......................... 86/19.7 |
| 5,064,320 A | * | 11/1991 | Markle | ........................ 86/19.7 |
| 5,624,215 A | * | 4/1997 | Boucher et al. | ............. 409/131 |
| 7,155,789 B1 | | 1/2007 | Gracey | |

* cited by examiner

*Primary Examiner*—Michael Carone
*Assistant Examiner*—Jonathan C Weber
(74) *Attorney, Agent, or Firm*—Donald J. Ersler

(57) ABSTRACT

A case trimmer and chamfer tool preferably includes a trim die, an end cutter, a crank, an outer chamfer blade, an inner chamfer blade and a height adjustment ring. The end cutter is slidably retained in the trim die. The inner and outer chamfer blades are spring loaded. The end cutter trims a length of the cartridge case. The inner and outer wall of the cartridge case are chamfered by the inner and outer chamfer blades. An adjustment boss extends downward from one end of the crank and a rotating knob is retained on the other end thereof. The end cutter is retained in the adjustment boss. The height adjustment ring is retained on the adjustment boss. A second embodiment is adapted for handling straight cartridge cases instead of rifle cartridge cases. The case trimmer and chamfer tool and a cartridge case are retained in a loading press.

14 Claims, 5 Drawing Sheets

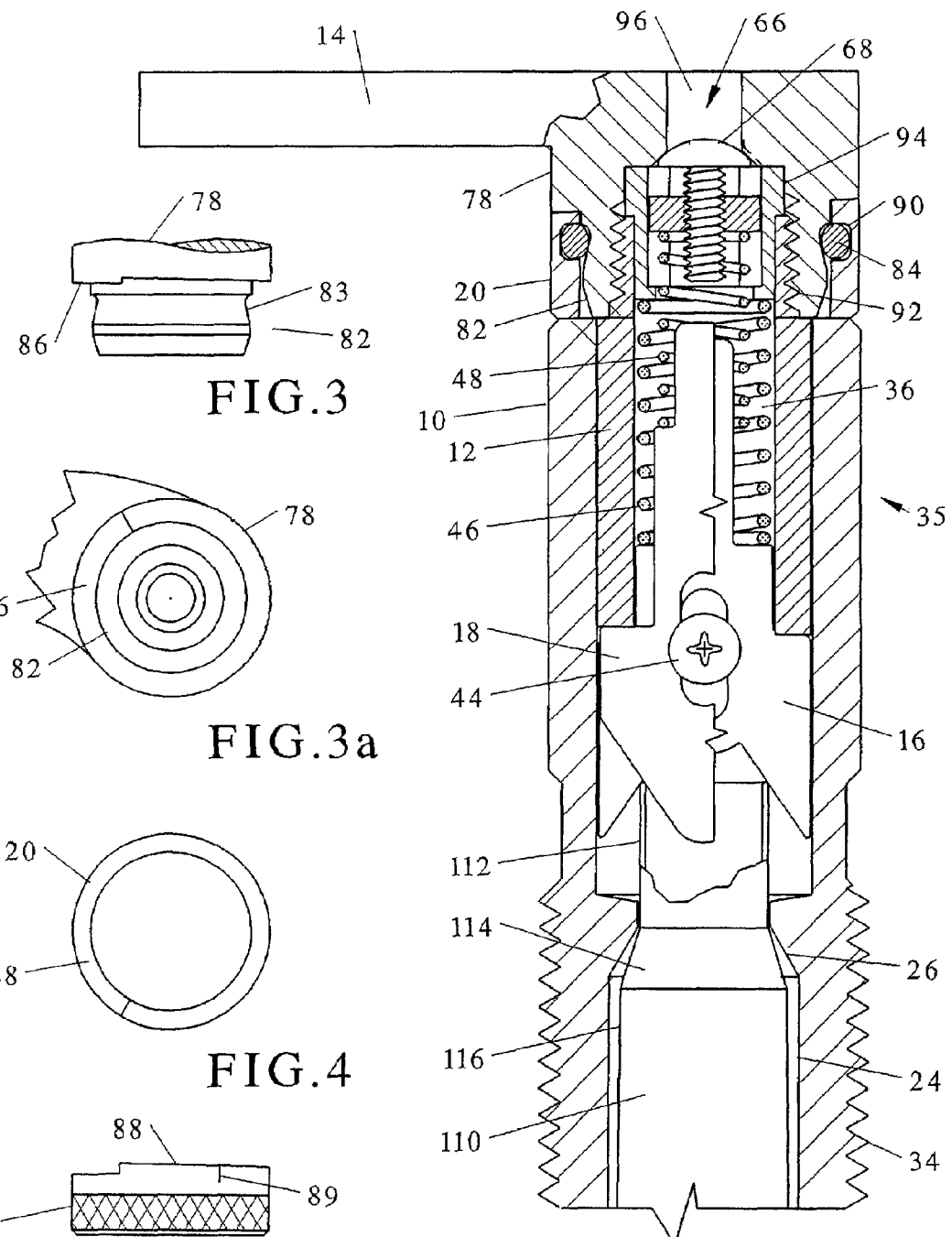

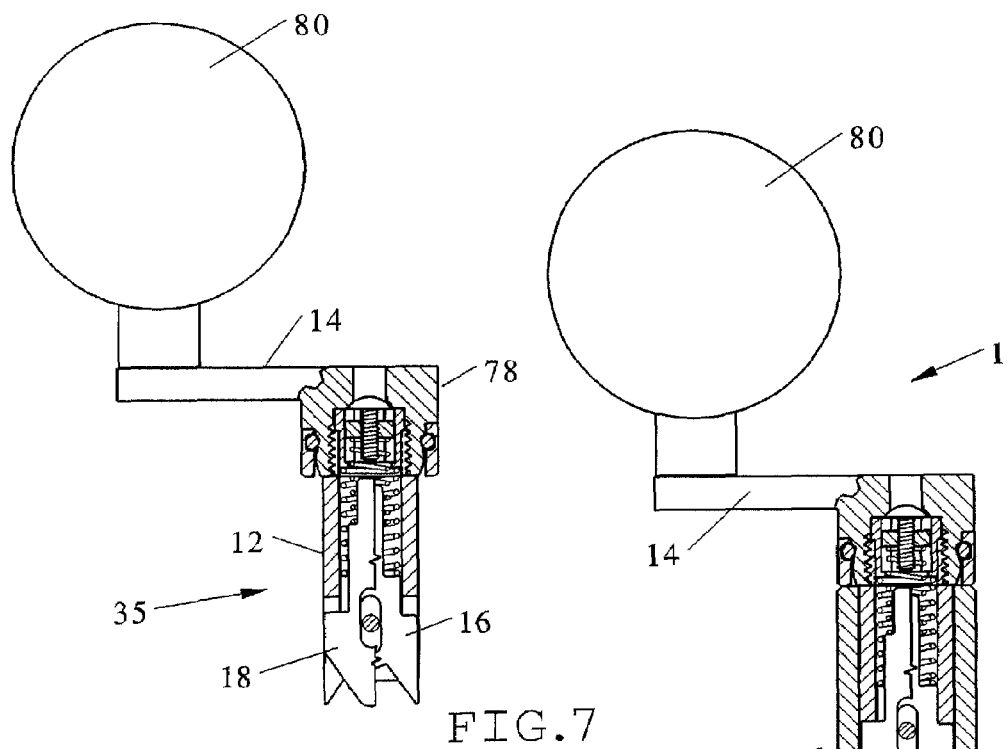
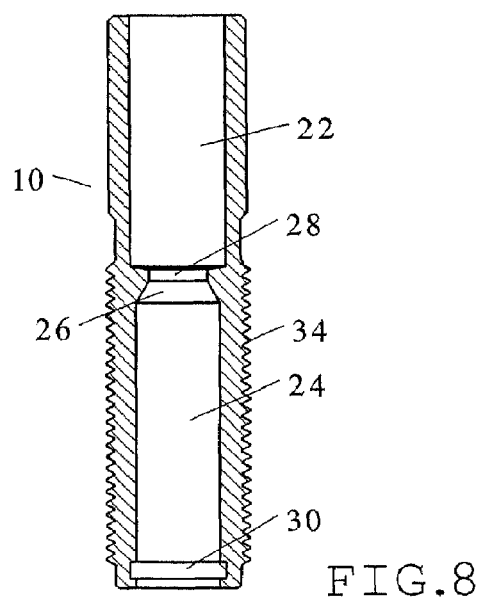
FIG.7
FIG.8
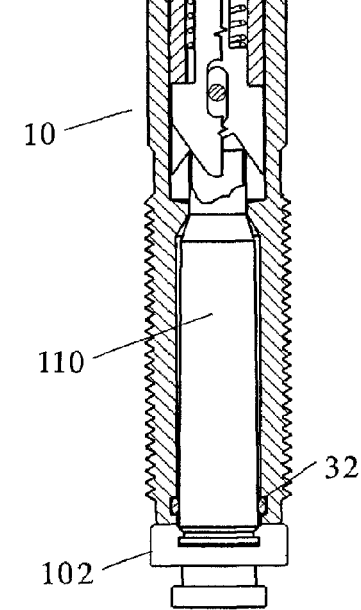
FIG.6

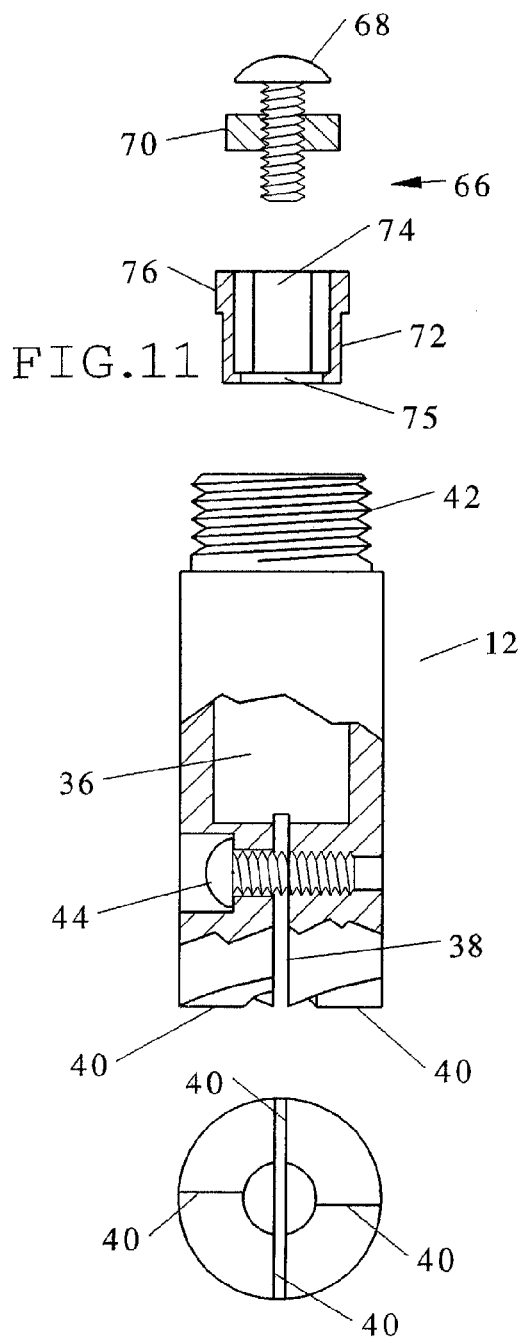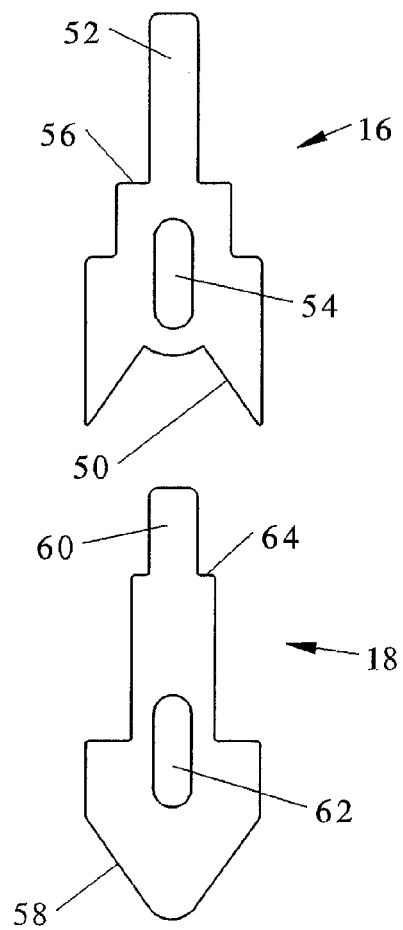

CASE TRIMMER AND CHAMFER TOOL

BACKGROUND OF THE INVENTION

1. Field of the Invention

The present invention relates generally to reusing cartridge cases and more specifically to a case trimmer and chamfer tool, which allows an inner surface, an outer surface and a length of a case to be chamfered and trimmed at the same time.

2. Discussion of the Prior Art

U.S. Pat. No. 3,818,563 to Beaulieu discloses a work-holding chuck and cartridge-case trimmer employing same. The Beaulieu patent includes a work holding chuck designed for use as a cartridge-case holder for reloading ammunition, especially in connection with a trimmer for cartridge cases, in which the holder is provided with a centering ball against which the empty primer pocket in the base is held by retaining fingers when is the case is placed in the holder.

U.S. Pat. No. 4,813,827 to Dugger discloses a power case trimmer. The Dugger patent includes a battery operated portable hand controlled cartridge case trimmer, which indexes on the entire length of the case and permits resizing based on the total explosive expansion of the cartridge. U.S. Pat. No. 7,155,789 to Gracey discloses a cutter adjustment system. The Gracey patent includes an improvement for a cartridge case trimmer, which indexes on the shoulder of the case as established by the resizing die and permits a rotating cutter assembly to trim the neck of cases from the inside at a controllable angle.

Accordingly, there is a clearly felt need in the art for a case trimmer and chamfer tool, which allows inner and outer surfaces of a cartridge case to be chamfered, and allows a length of the cartridge case to be trimmed with a height adjustment ring.

SUMMARY OF THE INVENTION

The present invention provides a case trimmer and chamfer tool, which allows an inner surface, an outer surface and a length of a case to be chamfered and trimmed to an industry standard length at the same time. Throughout this patent application, the terms, "cartridge case" and "shell" refer to the same object. The case trimmer and chamfer tool (case trim tool) includes a trim die, an end cutter, a crank, an outer chamfer blade, an inner chamfer blade. The trim die includes a cutter bore formed through one end and a shell bore formed through the other end. The cutter bore is sufficiently deep to provide lengthwise clearance for the inner and outer chamfer blades. The shell bore is terminated with a shell countersink in the trim die. The cutter bore is sized to rotatably receive the end cutter. A thread is formed on substantially one half of the outer diameter of the trim die, adjacent the shell bore.

The end cutter includes a cutter slot formed in substantially one end of the end cutter to receive a thickness of the inner and outer chamfer blades. A spring bore is formed through substantially a length thereof. At least one end cutting edge is formed on the one end of the end cutter to trim a height of a cartridge case. Substantially, the other end of the end cutter is necked-down and threaded. The inner and outer chamfer blades are axially retained in the cutter slot with a fastener. An outer chamfer spring forces the outer chamfer blade toward the one end of the end cutter. An inner chamfer spring forces the inner chamfer blade toward the one end of the end cutter. An adjustable inner chamfer assembly is inserted into the spring bore to adjust the tension of the inner chamfer spring. The inner chamfer spring is axially adjustable for changing cutting pressure of the inner chamfer blade for different calibers of cartridge cases.

The crank preferably includes an adjustment boss formed on one end and a rotating knob formed on the other end. An end of the adjustment boss is necked-down to receive an inner perimeter of a height adjustment ring. A second embodiment of the crank substitutes two contact pads for an inclined contact surface formed on a bottom of the crank. The height adjustment ring is located between the adjustment boss and the other end of the trim die. An inclined surface is formed on at least one end of the height adjustment ring to change a distance of the end cutter relative to a cartridge case inserted into the shell bore of the trim die. A second embodiment of the height adjustment ring includes two inclined surfaces instead of one.

In use, the case trim tool is threaded into a die holder of a loading press. A standard shell holder is secured to a ram of the loading press. A cartridge case is inserted into the standard shell holder. A press lever of the loading press is pulled to insert the cartridge case into the trim die. The adjustment ring is rotated to provide a particular trim length for the cartridge case. The crank is rotated with the rotating knob, until little or no resistance is felt. The cartridge case is removed and a new cartridge case is inserted.

Accordingly, it is an object of the present invention to provide a case trim tool, which allows an inner surface of a cartridge case to be chamfered.

It is a further object of the present invention to provide a case trim tool, which allows an outer surface of a cartridge case to be chamfered.

It is yet a further object of the present invention to provide a case trim tool, which allows an end of a cartridge case to be trimmed.

Finally, it is another object of the present invention to provide a case trim tool, which allows a cartridge case to be trimmed to a specific industry standard length by rotation of a height adjustment ring.

These and additional objects, advantages, features and benefits of the present invention will become apparent from the following specification.

BRIEF DESCRIPTION OF THE DRAWINGS

FIG. 2 is an enlarged cross sectional view of a portion of a case trim tool in accordance with the present invention.

FIG. 3 is a side view of a necked-down contour of a case trim tool in accordance with the present invention.

FIG. 3a is an end view of an adjustment boss of a crank of a case trim tool in accordance with the present invention.

FIG. 4 is an end view of a height adjustment ring of a case trim tool in accordance with the present invention.

FIG. 5 is a side view of a height adjustment ring of a case trim tool in accordance with the present invention.

FIG. 6 is a cross sectional view of a case trim tool with a standard shell holder in accordance with the present invention.

FIG. 7 is a cross sectional view of a case trim tool with a trim die removed in accordance with the present invention.

FIG. 8 is a cross sectional view of a trim die of a case trim tool in accordance with the present invention.

FIG. 9 is a side view of an outer chamfer blade of a case trim tool in accordance with the present invention.

FIG. 10 is a side view of an inner chamfer blade of a case trim tool in accordance with the present invention.

FIG. 11 is a partial cross sectional exploded side view of an end cutter and an adjustable inner chamfer assembly of a case trim tool in accordance with the present invention.

FIG. 12 is an end view of an end cutter of a case trim tool in accordance with the present invention.

DETAILED DESCRIPTION OF THE PREFERRED EMBODIMENTS

Figure 1:
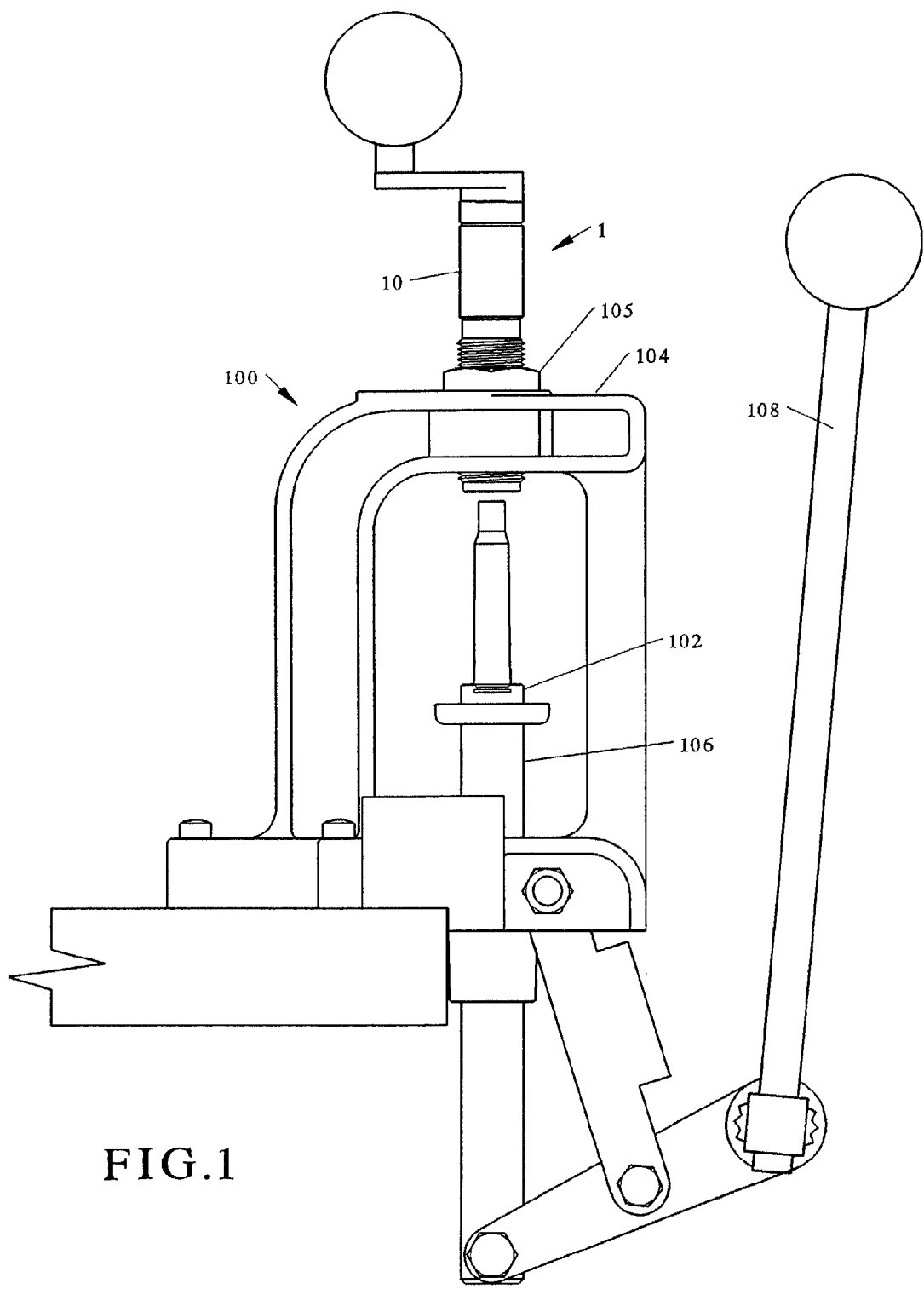
FIG. 1 is a side view of a case trim tool retained in a loading press in accordance with the present invention.
Figure 14:
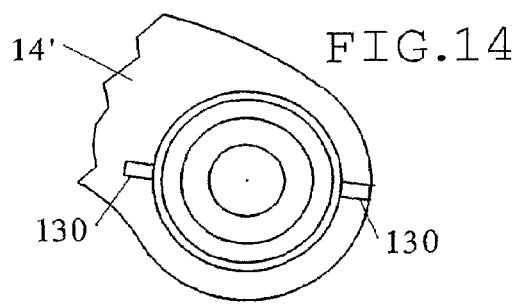
FIG. 14 is an end view of two adjustment pads of a second embodiment of a crank of a case trim tool in accordance with the present invention.
Figure 15:
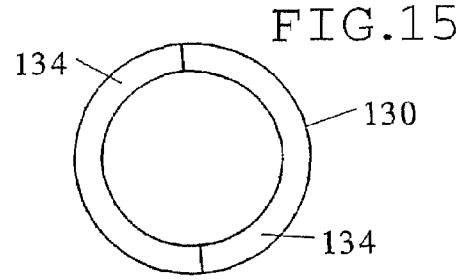
FIG. 15 is an end view of a second embodiment of a height adjustment ring of a case trim tool in accordance with the present invention.
Figure 16:
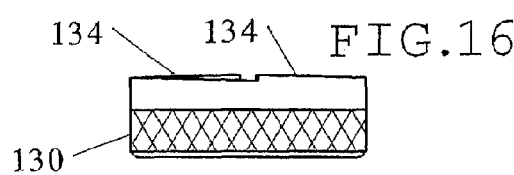
FIG. 16 is a side view of a second embodiment of a height adjustment ring of a case trim tool in accordance with the present invention.
Figure 17:
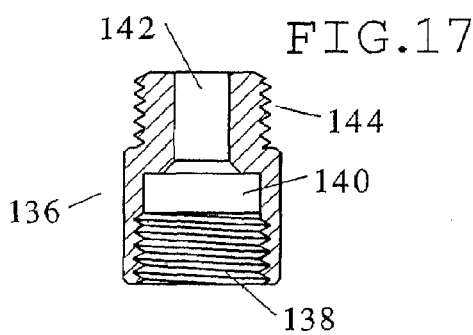
FIG. 17 is a cross sectional view of a length spacer of a case trim tool in accordance with the present invention.

With reference now to the drawings, and particularly to FIG. 1, there is shown a side view of a case trim tool 1 retained in a loading press 100. With reference to FIG. 2, the case trim tool 1 preferably includes a trim die 10, an end cutter 12, a crank 14, an outer chamfer blade 16, an inner chamfer blade 18 and a height adjustment ring 20. With reference to FIG. 8, the trim die 10 includes a cutter bore 22 formed through one end and a shell bore 24 formed through the other end. The cutter bore 22 is sufficiently deep to provide a lengthwise clearance for the inner and outer chamfer blades.

An overall length of the trim die 10 preferably equals a length of a nonthreaded portion of the end cutter 12 plus a mid-tolerance of industry standard cartridge case length, minus 0.125 inch, which is the portion of the cartridge case retained in a standard shell holder 102. The shell bore 24 is terminated with a shell countersink 26 to suit the caliber of cartridge case being trimmed. The shell countersink 26 is terminated with a neck bore 28. The neck bore 28 is sized to slidably receive a neck 112 of a cartridge case 110. A diameter of the neck bore 28 is preferably the same size as that of a neck chamber in a rifle. A specific cartridge case requires a specific trim die 10, counterbore 26, neck bore 28 and shell bore 24.

The cutter bore 22 is sized to rotatably receive the end cutter 12. The shell bore 24 is sized to provide clearance for a body 116 of the cartridge case 110 and the shell countersink 26 is to provide clearance for a shoulder 114 of the cartridge case 110. With reference to FIGS. 6-8, at least one o-ring groove 30 is formed in the shell bore 24 at substantially an entrance to receive at least one o-ring 32. The at least one o-ring 32 prevents the cartridge case 110 from rotating during trimming and chamfering. One o-ring 32 is sufficient to prevent smaller cartridge cases from rotating during trimming, but larger cartridge cases will need more than one o-ring 32 to prevent rotation during trimming. A thread 34 is formed on the outer diameter of the trim die 10, adjacent the shell bore 24. A case trim tool assembly 35 is the case trim tool 1 without the trim die 10.

With reference to FIGS. 11-12, an end cutter 12 includes a cutter slot 38 formed in substantially one end of the end cutter 12 to receive a thickness of the inner and outer chamfer blades. A spring bore 36 is formed through substantially a length the end cutter 12. At least one end cutting edge 40 is formed on the one end of the end cutter 12 to trim a length of the cartridge case 110. Substantially the other end of the end cutter 12 is necked-down and a thread 42 formed thereupon. The inner and outer chamfer blades are axially retained in the spring bore 22 with a fastener 44 that is threaded into the end cutter 12. An outer chamfer spring 46 forces the outer chamfer blade 16 toward the one end of the end cutter 12. An inner chamfer spring 48 forces the inner chamfer blade 18 toward the one end of the end cutter 12.

With reference to FIG. 9, the outer chamfer blade 16 includes a pair of inward angled cutting surfaces 50 formed on one end thereof and a clearance tang 52 formed on the other end thereof. An outer axial slot 54 is formed along an axis of the outer chamfer blade 16 to allow axial adjustment of the pair of inward angled cutting surface 50 relative to an end of the cartridge case 110. An outer spring support shoulder 56 is formed in substantially a middle of the outer chamfer blade 16 to support the outer chamfer spring 46.

With reference to FIG. 10, the inner chamfer blade 18 includes a substantially triangular cutting surface 58 formed on one end thereof and a spring tang 60 formed on the other end thereof. An inner axial slot 62 is formed along an axis of the inner chamfer blade 18 to allow axial adjustment of the triangular cutting surface 58 relative to an end of the cartridge case 110. An inner spring support shoulder 64 is formed at substantially the other end of the inner chamfer blade 18 to support the inner chamfer spring 48.

An adjustable inner chamfer assembly 66 includes a threaded fastener 68, a hex nut 70 and an adjustment bushing 72. The adjustment bushing 72 includes a hex inner perimeter 74 and a shoulder stop 76. The hex inner perimeter 74 is formed through substantially all of a length of the adjustment bushing 74. A spring clearance opening 75 is formed through one end of the adjustment bushing 72. The hex inner perimeter 74 is sized to slidably receive an outer perimeter of the hex nut 70 and an outer perimeter of the inner chamfer spring 48. The threaded fastener 68 is threadably retained by the hex nut 70. An outer perimeter of the adjustable bushing 72 is sized to be received by the spring bore 36 in the end cutter 12. The shoulder stop 76 prevents the adjustment bushing from being fully inserted into the spring bore 36. The adjustable inner chamfer assembly 66 allows the spring pressure on the inner chamfer blade 18 to be adjusted by rotation of the threaded fastener 68.

With reference to FIGS. 6-8, the crank 14 includes an adjustment boss 78 formed on one end and a rotating knob 80 retained on the other end. An end of the adjustment boss 78 includes a necked-down contour 82 that is sized to receive an adjustment o-ring 84 and the height adjustment ring 20. A tapered o-ring groove 83 is formed at a bottom of the necked-down contour 82. A boss inclined surface 86 is formed on a bottom of the necked-down contour 82 to receive a ring inclined surface 88 formed on an end of the height adjustment ring 20. The tapered o-ring groove 83 forces the ring inclined surface 88 of the adjustment o-ring 84 against the boss inclined surface 86 of the adjustment boss 78 to eliminate play therebetween. Rotation of the height adjustment ring 130 changes a trimmed length of the cartridge case 110. A motor could also be used to rotate the end cutter 12 instead of the crank 14.

Figure 18:
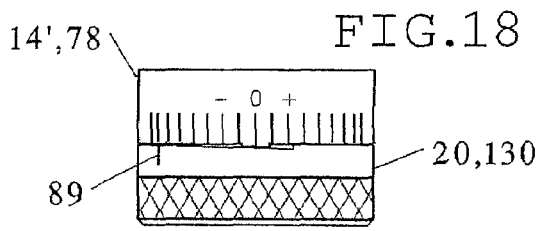
FIG. 18 is an end view of one end of a crank of a case trim tool in accordance with the present invention.
Figure 13:
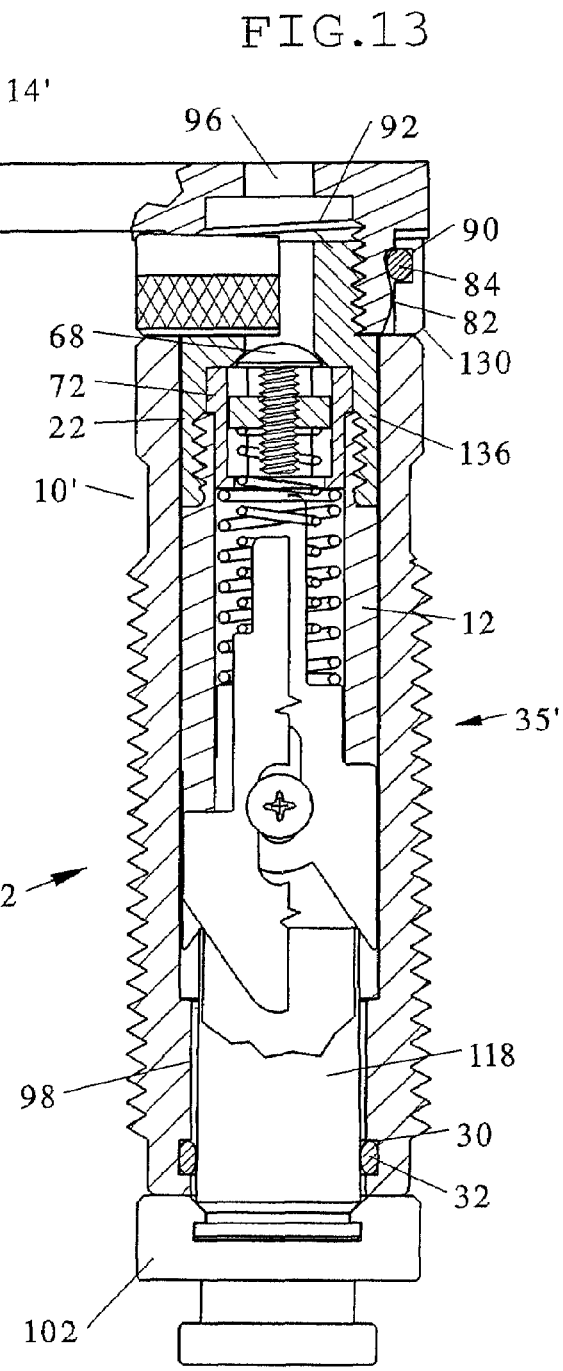
FIG. 13 is an enlarged cross sectional view of a case trim tool with a second embodiment of a crank and a trim die in accordance with the present invention.

An indicator mark 89 is formed on a side of the height adjustment ring 20. With reference to FIG. 18, the ring indicator mark 89 on the height adjustment ring 20, 130 is aligned with one of the boss indicator marks 91 formed on a side of the adjustment boss 78 or on an end of the crank 14'. The following dimension is given by way of example and not way of limitation, it is preferably that each boss indicator mark represents a length of 0.001 inch, but other dimensions may also be used.

An o-ring groove 90 is formed in an inner perimeter of the height adjustment ring 20 to receive the adjustment o-ring 84. A threaded hole 92 is formed in the adjustment boss 78 to threadably receive the thread 42 formed on the end cutter 12. A shoulder bore 94 is formed on a bottom of the threaded hole 92 to receive the shoulder 76 of the adjustment bushing 72. An adjustment hole 96 is formed through a top of the crank to provide access to the threaded fastener 68.

With reference to FIGS. 13-17, a second embodiment of a case trim tool 2 is shown. The case trim tool 2 includes a trim die 10' and a crank 14'. The trim die 10' includes a cutter bore 22 formed substantially through a length of the trim die 10'; a shell bore 98 formed through the other end of the trim die 10'; and a shortened non-threaded length. Otherwise, the trim die 10' includes all the features of the trim die 10. The crank 14' includes all the features of the crank 14 with the exception of the adjustment boss 78 and a pair of opposing contact pads 130. The necked-down diameter 82 extends directly from the crank 14'.

A pair of opposing contact pads 130 are formed on a bottom of the crank 14'. A height adjustment ring 132 includes a pair of inclined surfaces 134 formed on one end thereof. An o-ring groove 90 is formed in an inner perimeter of the height adjustment ring 130 to receive the adjustment o-ring 84. The pair of inclined surfaces 134 mate with the pair of opposing contact pads 130. Rotation of the height adjustment ring 130 changes a trimmed length of the cartridge case 110. A length spacer 136 may be used to compensate for a length of a cartridge case. A threaded hole 138 is formed in the length spacer 136 to threadably receive the thread 42 formed on the end cutter 12. A shoulder bore 140 is formed on an end of the threaded hole 138 to receive the shoulder 76 of the adjustment bushing 72. An adjustment hole 142 is formed through a top of the length spacer 136 to provide access to the threaded fastener 68. The threaded hole 92 formed in the necked-down diameter 82 is sized to threadably receive the thread 144 formed on the length spacer 136 or the end cutter 12.

In use, the trim die 10, 10' is preferably threaded into a die holder 104 of the loading press 100 and may be secured with a nut 105. The case trim tool assembly 35, 35' is inserted into the trim die 10, 10'. The standard shell holder 102 is secured to a ram 106 of the loading press 100. The cartridge case 110, 118 is inserted into the standard shell holder 102. A press lever 108 of the loading press 100 is pulled to insert the cartridge case 110, 118 into the trim die 10, 10'. The adjustment ring 20, 130 are rotated to provide a particular trim length for the cartridge case 110, 118. The crank 14, 14' are rotated with the rotating knob 80, until little or no resistance is felt. The cartridge case 110, 118 are removed and a new cartridge case is inserted. The trim die 10, 10' is removed by loosening the nut 105 and unthreading the trim die 10, 10' from the die holder 104.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A case trimmer comprising:
an end cutter having a cutting surface formed on one end thereof;
a trim die for removable retention in a loading press for reloading ammunition cartridges, a shell bore being formed in one end of said trim die, said end cutter being rotatably retained in the other end of said trim die;
means for rotating said end cutter;
an inner chamfer blade being retained in said end cutter, said inner chamfer blade being spring loaded with an inner chamfer spring; and
an outer chamfer blade being retained in said end cutter adjacent to said inner chamfer blade, said outer chamfer blade being spring loaded with an outer chamfer spring.

2. The case trimmer of claim 1, further comprising:
a height adjustment ring being retained on one end of said means for rotating said end cutter, rotation of said height adjustment ring changes a distance between a bottom of said means for rotating said end cutter and the other end of said trim die.

3. The case trimmer of claim 1, further comprising:
a groove being formed in said shell bore, a tubular elastomeric material being inserted into said groove.

4. The case trimmer of claim 1, further comprising:
at least one tubular elastomeric material being retained in said shell bore, said at least one tubular elastomeric material preventing an ammunition cartridge inserted into said shell bore from rotating relative to said trim die.

5. The case trimmer of claim 4, further comprising:
at least one groove being formed in said shell bore, said at least one tubular elastomeric material being inserted into said at least one groove.

6. A case trimmer comprising:
an end cutter having a cutting surface formed on one end thereof;
a trim die for removable retention in a loading press for reloading ammunition cartridges, a shell bore being formed in one end of said trim die, said end cutter being rotatably retained in the other end of said trim die;
means for rotating said end cutter;
an inner chamfer blade being retained in said end cutter, said inner chamfer blade being spring loaded with an inner chamfer spring;
an adjustable inner chamfer assembly for adjusting tension on said inner chamfer spring; and
an outer chamfer blade being retained in said end cutter adjacent to said inner chamfer blade, said outer chamfer blade being spring loaded with an outer chamfer spring.

7. The case trimmer of claim 6, further comprising:
a height adjustment ring being retained on one end of said means for rotating said end cutter, rotation of said height adjustment ring changes a distance between a bottom of said means for rotating said end cutter and the other end of said trim die.

8. The case trimmer of claim 6, further comprising:
a groove being formed in said shell bore, a tubular elastomeric material being inserted into said groove.

9. The case trimmer of claim 6, further comprising:
at least one tubular elastomeric material being retained in said shell bore, said at least one tubular elastomeric material preventing an ammunition cartridge inserted into said shell bore from rotating relative to said trim die.

10. The case trimmer of claim 9, further comprising:
at least one groove being formed in said shell bore, said at least one tubular elastomeric material being inserted into said at least one groove.

11. A case trimmer comprising:
an end cutter having a cutting surface formed on one end thereof;

a trim die for removable retention in a loading press for reloading ammunition cartridges, a shell bore being formed in one end of said trim die, said end cutter being rotatably retained in the other end of said trim die;

means for rotating said end cutter;

a height adjustment ring being retained on one end of said means for rotating said end cutter;

an inner chamfer blade being retained in said end cutter, said inner chamfer blade being spring loaded with an inner chamfer spring; and an outer chamfer blade being retained in said end cutter adjacent to said inner chamfer blade, said outer chamfer blade being spring loaded with an outer chamfer spring.

12. The case trimmer of claim 11, further comprising:

a groove being formed in said shell bore, a tubular elastomeric material being inserted into said groove.

13. The case trimmer of claim 11, further comprising:

at least one tubular elastomeric material being retained in said shell bore, said at least one tubular elastomeric material preventing an ammunition cartridge inserted into said shell bore from rotating relative to said trim die.

14. The case trimmer of claim 13, further comprising:

at least one groove being formed in said shell bore, said at least one tubular elastomeric material being inserted into said at least one groove.

\* \* \* \* \*